UNITED STATES PATENT OFFICE 3,014,891
Patented Dec. 26, 1961

3,014,891
RESINOUS COMPOSITIONS
Kenneth B. Goldblum, Pittsfield, Mass., assignor to General Electric Company, a corporation of New York
No Drawing. Filed Aug. 22, 1957, Ser. No. 679,740
8 Claims. (Cl. 260—47)

This invention relates to polycarbonate resins having desirable physical, chemical and electrical properties, and to their preparation. More particularly, it relates to polycarbonate compositions containing as a constituent part thereof dihydric phenol-derived carbonate units, in which the carbonate radical is directly attached to a nuclear carbon atom, i.e., to a carbon atom of an aromatic ring, said polycarbonate compositions being cross-linked by means of methylene group containing materials.

Various types of polycarbonate resins are known, among which are those prepared by the vinyl polymerization of unsaturated carbonate esters such as allyl carbonates, etc., from the ester interchange of carbonate esters with glycols, and by the reaction of dihydroxymonoaryl compounds such as hydroquinone and resorcinol with phosgene or carbonate esters. Such polycarbonate materials are of limited usefulness because they do not have a desirable combination of physical properties. More useful are those polycarbonate resins which contain carbonate units derived from dihydric phenols and copolymers of such carbonate resins with other materials. While such compositions are characterized by good physical, chemical and electrical properties having a relatively high softening point as well as desirable tensile strength, impact strength, and even in certain instances, rubber-like elastic properties, they are quite readily soluble in certain organic solvents, such as dioxane, chloroform, methylene chloride, tetrahydrofuran, dimethyl formamide and chlorobenzene, among others, so that their final use is limited to those uses in which they do not come in contact with such organic solvents. Furthermore, while their softening point is generally in the order of about 150° C., they are still a thermoplastic material and, as such, are not suitable for uses such as in electrical equipment and the like, where temperatures in excess of 150° C. are encountered.

Briefly stated, the compositions of this invention comprise carbonate polymers or resins containing structural units derived from dihydric phenols and polycarbonate copolymers of dihydric phenols with other materials, the carbonate units in the case of dihydric phenol derived materials being attached directly to a nuclear carbon, and in the case of the resin being cross-linked by means of methylene radical-containing materials.

Any dihydric phenol compound is useful in the practice of this invention, such dihydric phenol being defined as a mononuclear or polynuclear phenol type material in which the hydric or hydroxyl groups are attached directly to nuclear carbon atoms. The dihydric phenol compounds used in connection with the invention can typically be represented by the general formula (I) 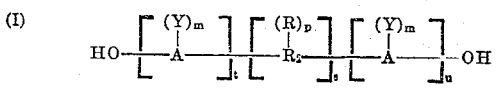

where R is hydrogen or a monovalent hydrocarbon radical, for example, alkyl radicals (e.g., methyl, ethyl, propyl, isopropyl, butyl, decyl, etc.), aryl radicals (e.g., phenyl, naphthyl, biphenyl, tolyl, xylyl, etc.), aralkyl radicals (e.g., benzyl, ethylphenyl, etc.), cycloaliphatic radicals (e.g., cyclopentyl, cyclohexyl, etc.) as well as monovalent hydrocarbon radicals containing inert substituents therein, such as halogen (chlorine, bromine, fluorine, etc.). It will be understood that where more than one R is used, they may be alike or different. $R_2$ is selected from the group consisting of an alkylene and alkylidene residue such as methylene, ethylene, propylene, propylidene, isopropylidene, butylene, butylidene, isobutylidene, amylene, isoamylene, amylidene, isoamylidene, cyclohexylidene, etc. $R_2$ can also be a silane radical or can be polyalkoxy, such as polyethoxy, polypropoxy, polythioethoxy, polybutoxy, polyphenylethoxy, or polyorganosiloxy, for example, polydimethylsiloxy, polydiphenylsiloxy, polymethylphenylsiloxy, etc. $R_2$ can also consist of two or more alkylene or alkylidene groups such as above, separated by the residue of an aromatic nucleus, a tertiary amino radical, an ether radical, a carbonyl radical, silane radical or siloxy radical, or by a sulfur-containing radical such as sulfide, sulfoxide, sulfone, etc. $R_2$ may also be a glycol dibasic acid ester residue derived from, for example, dibasic acids such as adipic, azelaic, sebacic, isophthalic, terephthalic and other glycols. Other groupings which can be represented by $R_2$ will occur to those skilled in the art. A is the residue of an aromatic nucleus, Y is a substituent selected from the group consisting of (a) inorganic atoms, (b) inorganic radicals, and (c) organic radicals, (a), (b) and (c) being inert to and unaffected by the reactants and by the reaction conditions, $m$ is a whole number including zero to a maximum equivalent to the number of replaceable nuclear hydrogens substituted on the aromatic hydrocarbon residue, $p$ is a whole number including zero to a maximum determined by the number of replaceable hydrogens on $R_2$, $s$ ranges from 0 to 1, $t$ and $u$ are whole numbers including zero. When $s$ is zero, however, either $t$ or $u$ may be zero, and not both.

In the dihydric phenol compound, the substituents Y may be the same or different as may be the R. Among the substituents represented by Y are halogen (e.g., chlorine, bromine, fluorine, etc.) or oxy radicals of the formula OW, where W is a monovalent hydrocarbon radical similar to R, or monovalent hydrocarbon radicals of the type represented by R. Other inert substituents such as nitro group can be represented by Y. Where $s$ is zero in Formula I, the aromatic nuclei are directly joined with no intervening alkylene or alkylidene or other bridge. The positions of the hydroxyl groups and Y on the aromatic nuclear residues A can be varied in the ortho, meta, or para positions and the groupings can be in a vicinal, asymmetrical or symmetrical relationship, where two or more of the nuclearly bonded hydrogens of the aromatic hydrocarbon residue are substituted with Y and the hydroxyl group. Examples of dihydric phenol compounds that may be employed in this invention include 2,2-bis-(4-hydroxyphenyl)-propane (bisphenol-A); 2,4'-dihydroxydiphenyl-methane; bis-(2-hydroxyphenyl)-methane; bis-(4-hydroxyphenyl)-methane; bis-(4-hydroxy-5-nitrophenyl)-methane; bis-(4-hydroxy-2,6-dimethyl-3-methoxyphenyl)-methane; 1,1 - bis-(4-hydroxyphenyl)-ethane; 1,2-bis-(4-hydroxyphenyl)-ethane; 1,1-bis-(4-hydroxy-2-chlorophenyl)-ethane; 1,1-bis-(2,5-dimethyl-4-hydroxyphenyl)-ethane; 1,3 - bis-(3-methyl-4-hydroxyphenyl)-propane; 2,2 - bis - (3-phenyl-4-hydroxyphenyl)-propane; 2,2-bis-(3-isopropyl-4-hydroxyphenyl)-propane; 2,2-bis-(4-hydroxynaphthyl)-propane; 2,2-bis-(4-hydroxyphenyl)-pentane; 3,3 - bis-(4-hydroxyphenyl)-pentane; 2,2-bis-(4-hydroxyphenyl)-heptane; bis-(4-hydroxy-phenyl)-phenyl methane; bis-(4-hydroxyphenyl)-cyclohexyl methane; 1,2-bis-(4-hydroxyphenyl)-1,2-bis-(phenyl) ethane; 2,2 - bis - (4 - hydroxyphenyl)-1,3-bis-(phenyl) propane; 2,2-bis-(4-hydroxyphenyl)-1-phenyl propane; and the like. Also included are dihydroxybenzenes typified by hydroquinone and resorcinol, dihydroxydiphenyls such as 4,4'-dihydroxydiphenyl; 2,2'-dihydroxydiphenyl; 2,4'-dihydroxydiphenyl; dihydroxynaphthalenes such as 2,6-dihydroxynaphthalene, etc. Dihydroxy aryl sulfones, such as those set forth in application Serial No. 613,817 filed October 4, 1956, assigned to the same assignee as this invention, are also useful, e.g., bis-(4-hydroxyphenyl)-sulfone; 2,4'-dihydroxydiphenyl sulfone; 5'-chloro-2,4'-dihydroxydiphenyl sulfone; 5'-chloro-2,4'-dihydroxydiphenyl sulfone; 3'-chloro-4,4'-dihydroxydiphenyl sulfone; bis-(4-hydroxyphenyl) biphenyl disulfone, etc. The preparation of these and other useful sulfones is described in Patent 2,288,282, Huissmann. Polysulfones as well as substituted sulfones using halogen, nitrogen, alkyl radicals, etc. are also useful. Dihydroxy aromatic ethers such as those set forth in application Serial No. 598,768 filed July 19, 1955, assigned to the same assignee as this invention, are also useful. Methods of preparing such materials are found in Chemical Reviews, 38, 414–417 (1946) and Patent 2,739,171, Linn. Exemplary of such dihydroxy aromatic ethers are 4,4'-dihydroxydiphenyl ethers; 4,4'-dihydroxytriphenyl ether; the 4,3'- 4,2'-, 3,3'-, 2,2'- 2,3'-, etc. dihydroxydiphenyl ethers; 4,4'-dihydroxy-2,5-dimethyldiphenyl ether; 4,4'-dihydroxy-2,6-dimethyldiphenyl ether; 4,4'-dihydroxy-3,3'-di-isobutyldiphenyl ether, 4,4'-dihydroxy-3,3'-diisopropyldiphenyl ether; 4,4'-dihydroxy-3,2'-dinitrodiphenyl ether; 4,4'-dihydroxy-3,3'-dichlorodiphenyl ether; 4,4'-dihydroxy-3,3'-difluorodiphenyl ether; 4,4'-dihydroxy-2,3'-dibromodiphenyl ether; 4,4'-dihydroxydinaphthyl ether; 4,4'-dihydroxy-3,3'-dichlorodinaphthyl ether; 2,4'-dihydroxytetraphenyl ether; 4,4'-dihydroxypentaphenyl ether; 4,4'-dihydroxy-2,6-dimethoxy diphenyl ether; 4,4'-dihydroxy-2,5-diethoxydiphenyl ether, etc. Mixtures of the dihydric phenols can also be employed and where dihydric phenol is mentioned herein, mixtures of such materials are considered to be included.

When a carbonate ester is used in the preparation of the basic material which is to be cross-linked, the ingredients are reacted at temperatures from about 150° C. to 300° C. or higher for times varying from 1 to 15 or more hours. Under such conditions, an ester interchange occurs between the carbonate ester and the dihydric phenol compound. The ester interchange is advantageously carried out at reduced pressures of around 10 to 100 mm. of mercury, preferably in an inert atmosphere such as of nitrogen, argon, krypton, etc. to prevent undesirable oxidative effects, especially where higher reaction temperatures are used under moderate subatmospheric pressures. Heating under vacuum after the ester interchange is substantially complete (vacuum cooking), for example, at from about 150° C. to 300° C. at 0.01 to 5 to 10 mm. of mercury for extended periods of time tends to increase the molecular weight of the carbonate polymer.

Although the reaction can be carried out in the absence of a catalyst, one may, if desired, use the usual ester exchange catalysts, for instance, metallic lithium, potassium, calcium, beryllium, magnesium, zinc, cadmium, aluminum, chromium, molybdenum, iron, cobalt, nickel, silver, gold, tin, antimony, lead, barium, strontium, platinum, palladium, etc. and compounds thereof such as alcoholates, oxides, carbonates, acetates, hydrides, etc. Additional catalysts and variations in the ester exchange methods are discussed in Groggins' Processes in Organic Synthesis" (4th edition, McGraw-Hill Book Company, 1952), pages 616 to 620. The amount of such catalyst is usually quite small and is of the order of 0.001 to 0.1 percent, by weight, based on the total weight of the reactants.

The diaryl carbonates useful in this connection can be represented by the general formula (II)     

where A is an organic residue in the same sense as in Formula I, Z is an inorganic or organic radical in the same sense as Y of Formula I, and $n$ is an integer. Examples of carbonate esters comprise symmetrical carbonates, for example, diphenyl carbonate, di-(halo-phenyl) carbonates, e.g., di-(chlorophenyl) carbonate, di-(bromophenyl) carbonate; di-(polyhalophenyl) carbonates, e.g., di-(trichlorophenyl) carbonate, di-(tribromophenyl) carbonate, etc.; di-(alkylphenyl) carbonates, e.g., di-(tolyl) carbonate, etc., di-(naphthyl) carbonate, di-(chloronaphthyl) carbonate, etc., unsymmetrical carbonates, for example, phenyl tolyl carbonate, chlorophenyl chloronaphthyl carbonate, trichlorophenyl chlorotolyl carbonate, etc. Mixtures of the foregoing carbonate esters can also be employed.

These diaryl carbonates can be prepared by the methods described in A. F. Holliman et al., Rec. Trav. Chem. 36, 271 (1916) and Copisarow, J. Chem. Soc. (Brit.) 1929, 251, both of whom disclose preparing dicresyl carbonate by treating the alkali metal salts of p-cresol with phosgene, and U.S. Patent 2,362,865, Tryon et al., which discloses preparing diphenyl, ditolyl and dinaphthyl carbonates by passing phosgene through a column of the phenol in the presence of a catalyst, etc.

Employing the above method of preparing the polycarbonate polymers by ester interchange using a vacuum cook, the products in the final stages of the reaction become quite viscous and difficult to handle. I therefore prefer generally to carry out the reaction using phosgene or phosgene-like dibasic acid halide in an organic basic material such as a tertiary amine (e.g., pyridine, dimethylaniline, quinoline, etc.). The base can be used undiluted or diluted with inert solvents, for example, hydrocarbons such as benzene, toluene, xylene, etc., and halocarbons such as chloroform, chlorobenzene, methylene chloride, etc. Tertiary amines are advantageous in that they serve to catalyze the reaction, are good solvents, and act as acceptors for halogen acid given off during the reaction.

Although the phosgene reaction can be carried out over a wide range of temperatures, for example, from below 0° C. to over 100° C., the reaction proceeds satisfactorily at 25° C. to 50° C. Since the reaction is exothermic, the rate of phosgene addition can be used to control the reaction temperature. Substantially equimolar amounts of phosgene can be used, although an excess of up to 1.5 moles or more may be employed.

Suitable phosgene-like dibasic acid halides, in addition to phosgene, include, for example, dibromo and diiodo carbonyls as well as the bishaloformates of dihydric phenols (e.g., bischloroformates of hydroquinone, bisphenol-A, etc.) or glycols (e.g., bischloroformates of ethylene glycol, neopentyl glycol, polyethylene glycol, etc.). Other carbonate precursors will occur to those skilled in the art.

It will be seen that whether a carbonate ester or phosgene is used in the reaction, the dihydric phenol will produce a dihydric phenol carbonate structural unit which can typically be represented by the following general formula wherein the various letters have the same meaning as above:

(III)    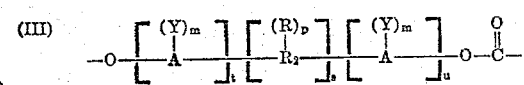

In addition to the polymers described above, copolymers containing carbonate units are also susceptible to cross-linking by means of methylene radical-containing materials. Such copolymer compositions are described, for example, in copending application S.N. 638,239, assigned to the same assignee as this invention which hereby is included by reference as a part of this application. Other materials which are susceptible to treatment according to this invention are polycarbonate copolymers of dihydric phenols and sulfones as disclosed in copending application S.N. 679,745; copolymers of dihydric phenols and aromatic ethers as disclosed in copending application S.N. 679,746 and copolymers of dihydric phenols and dibasic acids as disclosed in copending application S.N. 679,743, all of the above copending applications being assigned to the same assignee as this invention and being incorporated herein by reference.

The methylene radical-containing materials which are useful in connection with this invention include hexamethylenetetramine and paraform.

In general, from about 0.5 to 30 percent, by weight of the methylene radical-containing material based on the weight of the polycarbonate material, is added to the polycarbonate material, depending on the number of methylene radicals or groups in the material and upon the particular polycarbonate material to be used. The divided cross-linking material is mixed dry with the polycarbonate material at room temperature in any suitable manner or at any temperature up to the curing temperature. The mixture is heated preferably with manipulation at a temperature varying from about 100° C. to 300° C. and preferably from about 150° C. to 250° C. until a cured state is attained. The time of curing, of course, depends upon the temperature, lower temperatures requiring a longer time and higher temperatures a shorter time.

The following examples will illustrate the practice of the present invention and are not to be taken in any way as limiting in so far as the scope of the invention is concerned.

Example 1

The polycarbonate resin used in this example was prepared by the vacuum cook method using 68.4 grams (0.3 mole) of bisphenol-A and 64.2 grams (0.3 mole) of diphenyl carbonate. These materials were charged to an oil bath heated reactor equipped with a stirrer, an inert gas inlet, a condenser receiving system connected to vacuum means for creating a sub-atmospheric pressure. Nitrogen was slowly introduced into the reactor system to which vacuum was gradually applied. Initial distillation of phenol began when the bath temperature reached about 185 to 190° C. after about ½ hour of heating, and continued rapidly for 1.1 to 1½ hours at this temperature and a pressure of 10 mm. Hg during which time most of the phenol was evolved. The temperature of the heating bath was then slowly raised to about 290° C. under the nitrogen reduced pressure system of about 9 to 12 mm. Hg and held at this point for about 4.5 hours, during which time the viscosity of the reaction mixture increased. To about 0.5 gram of the polycarbonate prepared as above, there was added about 0.1 gram of hexamethylenetetramine on a hot plate at about 180° C. The material was mixed and stroked with a spatula and in about 30 seconds the combination produced a yellow, rubbery, non-melting product which became brittle upon cooling. The product was insoluble in dioxane, indicating that cross-linking had taken place.

Example 2

The polycarbonate resin was prepared as above by the vacuum cook method using 0.3 mole of bisphenol-A and 0.33 mole (10 percent excess) of diphenyl carbonate. After phenol distillation as above, the ingredients were cooked for four hours at 0.2 mm. Hg of pressure. The resultant polycarbonate resin was mixed in the amount of about 0.5 gram with about 0.1 gram of hexamethylenetetramine on a hot plate at 180° C. After about 5 minutes' stroking with a spatula, the mixture was converted to a yellow, rubbery, non-melting mass indicative of cross-linking. Pieces of the same resin stroked without the hexamethylenetetramine did not change in appearance. The cross-linked resin was insoluble in dioxane and similar materials.

Example 3

The polycarbonate resin used in this example was prepared by adding to a reaction vessel 300 lb. of pyridine, 30 lb. of bisphenol-A, along with 28 grams of phenol. Phosgene was admitted to the reaction solution by bubbling at the rate of about 12 lb. per hour with stirring at a temperature of about 25 to 35° C. for about 1 hour, 12 minutes. At this point, about 3 lb. of phenol dissolved in pyridine was added to the stirred reaction mixture. The polycarbonate resin was precipitated with isopropanol, washed twice with isopropanol, and filtered by centrifuging after each mixture.

Mixtures of the above polycarbonate resin were made with varying amounts of hexamethylenetetramine, ranging from 0.5 percent to 20 percent, by weight, the mixtures being dissolved in chloroform and samples of the solution placed in aluminum dishes at room temperature until the solvent has evaporated. The samples were then placed in a 230° C. air circulating oven and samples were withdrawn periodically and tested for solubility in paradioxane. The sample containing 0.5 percent hexamethylenetetramine had some insoluble material after being in the oven for about 16 hours at 230° C. Those samples with more than 1 percent, by weight, hexamethylenetetramine had some insoluble material after six hours' exposure in the oven, and the samples with 5 percent hexamethylenetetramine or more contained insoluble material after 30 minutes of cure.

From the above it may be concluded that amounts of methylene containing cross-linking agents, such as hexamethylenetetramine when used in amounts of at least about 0.5 percent, by weight, with polycarbonate resins will produce a cross-linked material. Of course, it will be realized that the degree of cross-linking may be varied to obtain varying final products.

Materials of this invention are useful in any applications where a tough, flexible coating or film is required for protecting or insulating a base material. Thus, they are useful as insulating wire coatings, the polycarbonate material mixed with the methylene-containing material being dissolved in a suitable solvent such as chloroform and the like, through which the wire is passed, then heated to drive off the solvent, leaving a firm, flexible, high temperature-resistant film on the wire. The materials are also useful for making molding compounds which may be used as such or filled with other material, such as wood flour, silica in various forms, carbon black, divided metal, etc. for making molded parts of various shapes. Films of the material made in conventional manners are useful as wrapping or packaging materials, as liners, containers, covers, closures, sound recording and other tapes. Fibers formed from the material are useful for yarn, thread, bristles, rope, etc. The products of the invention are further very useful as laminating adhesives and as adhesives for other applications. The compositions can also be alloyed with other resinous materials.

What I claim as new and desire to secure by Letters Patent of the United States is:

1. A cross-linked resinous material comprising the reaction product of (1) a high molecular weight resinous linear carbonate polymer of a dihydric phenol and a carbonate precursor selected from the class consisting of carbonate esters, carbonyl halides and haloformates of a dihydric phenol, and (2) at least about 0.5 percent based upon the weight of the carbonate polymer of a material selected from the class consisting of hexamethylenetetramine and paraform.

2. A cross-linked resinous material comprising the reaction product of (1) a high molecular weight resinous linear carbonate polymer of a dihydric phenol and a carbonate precursor selected from the class consisting of carbonate esters, carbonyl halides and haloformates of a dihydric phenol, and (2) at least about 0.5 percent based upon the weight of the carbonate polymer of hexamethylenetetramine.

3. A cross-linked resinous material comprising the reaction product of (1) a high molecular weight resinous linear carbonate polymer of a dihydric phenol and a carbonate precursor selected from the class consisting of carbonate esters, carbonyl halides and haloformates, of a dihydric phenol, and (2) at least about 0.5 percent based upon the weight of the carbonate polymer of paraform.

4. A cross-linked resinous material comprising the reaction product of (1) a high molecular weight, resinous, linear carbonate polymer of 2,2-bis-(4-hydroxyphenyl)-propane and diphenyl carbonate, and (2) at least about 0.5 percent based upon the weight of the carbonate polymer of a material selected from the class consisting of hexamethylenetetramine and paraform.

5. A cross-linked resinous material comprising the reaction product of (1) a high molecular weight resinous linear carbonate polymer of a dihydric phenol and phosgene, and (2) at least about 0.5 percent based upon the weight of the carbonate polymer of a material selected from the class consisting of hexamethylenetetramine and paraform.

6. The process of preparing a cross-linked resinous material comprising reacting (1) a high molecular weight resinous linear polycarbonate resin of a dihydric phenol and a carbonate precursor selected from the class consisting of carbonate esters, carbonyl halides and haloformates of a dihydric phenol with (2) at least 0.5 percent based upon the weight of the carbonate polymer of a cross-linking material selected from the class consisting of hexamethylenetetramine and paraform.

7. The cross-linked resinous material of claim 1 in the form of a film.

8. The cross-linked resinous material of claim 1 in the form of a fiber.

References Cited in the file of this patent

UNITED STATES PATENTS

| | | |
|---|---|---|
| 1,697,713 | Bucherer | Jan. 1, 1929 |
| 1,933,124 | Seebach et al. | Oct. 31, 1933 |
| 2,027,337 | Heck | Jan. 7, 1936 |
| 2,493,075 | La Lande et al. | Jan. 3, 1950 |
| 2,614,096 | Spahr | Oct. 14, 1952 |
| 2,866,773 | Redfarn | Dec. 30, 1958 |

FOREIGN PATENTS

| | | |
|---|---|---|
| 532,543 | Belgium | Oct. 30, 1954 |

OTHER REFERENCES

Schnell: Angewandte Chemie, 68, No. 20, 633–660, Oct. 21, 1956.

Schildknecht: Polymer Processes, p. 297, Interscience Publishers, Inc., N. Y.